United States Patent [19]

Tomita et al.

[11] Patent Number: 4,637,684

[45] Date of Patent: Jan. 20, 1987

[54] METHOD OF MAKING AN OPTICAL COUPLER DEVICE UTILIZING VOLATILE LIQUID TO ACHIEVE OPTICAL CONTACT

[75] Inventors: Yasuo Tomita, Yokohama; Shigetaro Ogura, Musashino; Kazuya Matsumoto, Yokohama, all of Japan

[73] Assignee: Canon Kabushiki Kaisha, Tokyo, Japan

[21] Appl. No.: 701,653

[22] Filed: Feb. 14, 1985

Related U.S. Application Data

[62] Division of Ser. No. 401,249, Jul. 23, 1982.

[30] Foreign Application Priority Data

Jul. 31, 1981 [JP] Japan ............... 56-119155

[51] Int. Cl.$^4$ .................... G02B 6/34; C03B 35/00
[52] U.S. Cl. ............... 350/96.19; 350/96.10; 350/96.15; 350/96.12; 350/320; 65/24; 65/36; 65/61; 65/182.1
[58] Field of Search ............. 350/96.10, 96.11, 96.15, 350/96.12, 96.16, 96.17, 96.19, 162.2, 162.17, 162.21, 320; 65/24, 36, 37, 38, 61, 170, 182.1

[56] References Cited

U.S. PATENT DOCUMENTS

| | | | |
|---|---|---|---|
| 2,754,238 | 7/1956 | Arenberg | 350/358 |
| 3,578,848 | 5/1971 | Austin | 350/320 |
| 3,584,230 | 6/1971 | Ping | 350/96.19 |
| 3,864,061 | 2/1975 | Dakss et al. | 350/96.19 |
| 4,142,774 | 3/1979 | Wright | 350/96.19 |
| 4,143,338 | 3/1979 | Godard et al. | 350/286 |
| 4,227,769 | 10/1980 | Philips et al. | 350/96.19 |
| 4,289,371 | 9/1981 | Kramer | 350/162.2 |
| 4,314,283 | 2/1982 | Kramer | 350/96.19 |
| 4,336,982 | 6/1982 | Rector, Jr. | 350/358 |
| 4,425,023 | 1/1984 | Matsumoto et al. | 350/96.14 |
| 4,564,271 | 1/1986 | Bernard et al. | 350/320 |
| 4,565,422 | 1/1986 | Seymour et al. | 350/320 |

FOREIGN PATENT DOCUMENTS

| | | | |
|---|---|---|---|
| 53-115244 | 10/1978 | Japan | 350/96.12 |
| 54-71653 | 8/1979 | Japan | 350/96.19 |

OTHER PUBLICATIONS

Fukuzawa et al, "Mode Coupling in the Thin Film ...", Optics Lett., vol. 4, No. 11, 11/79, pp. 343-345.
"The Focal Encyclopedia of Photography", 1969, p. 1029.
"Optical Technique Handbook" (Japan) 10/68, 3 pages.
"Prism and Lens Making" (Japan) 1956, 2 pages.
Ulrich, Optimum Excitation of Optical Surface Waves, 61, Opt. Soc. Am., 11, pp. 1467-1477 (1971).
Tangonan et al, "Tapered Gap Prism ...", Applied Optics, vol. 16, No. 7, 7/77, pp. 1795-1797.

*Primary Examiner*—William L. Sikes
*Assistant Examiner*—Brian M. Healy
*Attorney, Agent, or Firm*—Fitzpatrick, Cella, Harper & Scinto

[57] ABSTRACT

A waveguide for propagating a light beam, a coupler for coupling the light beam to the waveguide, and a thin film layer provided on the bottom surface of the coupler and consisting of a substance having a refractive index lower than the refractive indices of the waveguide and the coupler, the coupler being joined to the waveguide by optical contact with the thin film layer interposed therebetween, together constitute an optical coupler device which is compact and stable in optical coupling characteristic.

7 Claims, 9 Drawing Figures

METHOD OF MAKING AN OPTICAL COUPLER DEVICE UTILIZING VOLATILE LIQUID TO ACHIEVE OPTICAL CONTACT

This application is a division of application Ser. No. 401,249 filed July 23, 1982.

BACKGROUND OF THE INVENTION

1. Field of the Invention

This invention relates to an optical coupler device comprising a coupler formed on an optical waveguide.

2. Description of the Prior Art

The optical communication technique whereby light is transmitted while being confined in a medium has achieved a rapid development by the advent of low loss optical fiber. Along therewith, a technique based on the concept of the integrated optics whereby a planar dielectric thin film is used as an optical waveguide and the interior of the thin film is endowed with the function of a lens, a filter or the like to thereby realize an optical integrated circuit in a sufficiently small form as compared with the conventional optical system is absorbing much interest. Such optical integrated circuit of course permits size reduction of the system as well as minimizing the problems peculiar to the conventional optical technique such as disturbance like vibration and reproducibility, and also has a great advantage in reducing the cost.

Applicant has already proposed in U.S. Pat. No. 4,425,023 an integrated optical structure 1 as shown in FIG. 1 of the accompanying drawings. In this integrated optical structure 1, an optical coupler 4 comprising a prism coupler, an interdigital electrode 5 and a thin film lens 6 are provided on a thin film waveguide 3 formed in a planar shape on a substrate 2 placed on XZ plane. An incident light beam $L_1$ is directed as a light beam $L_2$ into the waveguide 3 through the optical coupler 4. The light beam $L_2$ conducted through the waveguide 3 is diffracted and deflected by an ultrasonic wave surface elastic wave W energized by the interdigital electrode 5 provided on a part of the waveguide 3 and becomes a light beam $L_3$. This deflected light beam $L_3$ is condensed by the thin film lens 6 so that it forms a calescence point (beam spot) S on the exit end surface 7 of the waveguide 3. That is, the end surface 7 is formed at a position substantially coincident with the focal plane of the thin film lens 6 having a power in the XZ plane parallel to the waveguide 3, and the condensed light beam $L_4$ is condensed at or near the end surface 7 in X direction substantially orthogonal to the direction of travel of the light beam and exits therefrom. The distribution of light in the Y direction perpendicular to the XZ plane is limited by the thickness d of the waveguide 3 which is usually several μm.

In the integrated optical structure 1 of such configuration, the frequency of a high-frequency voltage applied to the interdigital electrode 5 is varied to change the wavelength of the ultrasonic wave surface elastic wave W propagated on the waveguide 3, whereby the deflection angle of the light beam $L_3$ is controlled and calescence point scanning is effected on the exit end surface 7. Thus, the integrated optical structure 1 is constructed compactly because a light deflector and a condenser lens are provided on the same substrate 2 and a calescence point S is formed and scanned on or near the exit end surface 7 of the waveguide 3.

The components of this integrated optical structure 1 will be described in greater detail. The substrate 2 may suitably be formed of a material which has a piezoelectric effect and through which the ultrasonic wave of high frequency can be efficiently propagated, and the substrate 2 should desirably be formed of $LiNbO_3$ (lithium niobate), $LiTaO_3$ (lithium tantalate) or ZnO (zinc oxide). As regards the waveguide 3, where the substrate 2 is formed of lithium niobate, Ti is diffused under a high temperature of 1000° C. and formed to a thickness of several μm on the substrate 2. Where the substrate 2 is formed of lithium tantalate, the waveguide 3 is obtained by diffusing Nb or Ti. Further combinations may be mentioned, but it is preferable that the waveguide 3 be formed of a material having a high refractive index and a great difference in refractive index from the substrate 2 and capable of conducting light even if the waveguide 3 is made thin. The high refractive index of the waveguide 3 enables the calescence point S formed on the end surface 7 by the thin film lens 6 to be very small in spot diameter, that is, very sharp.

However, the thickness of the dielectric thin film forming the thin film waveguide 3 is of the same degree as the wavelength of the light to be propagated and this leads to a difficulty in efficiently coupling the light into the waveguide 3. Therefore, various methods of coupling the waveguide 3 and the light wave have heretofore been proposed. These methods chiefly include the method of butt-edge coupling from the waveguide end surface and the method using an internal reflection prism or an optical diffraction grating. The butt-edge coupling method is not often adopted because of the problems such as the smoothness of the coupling end surface and the stability of the mechanical arrangement, and actually the method using a prism or a diffraction grating as shown in FIG. 1 has been utilized.

In a conventional optical coupler device using the prism coupling method, it is a requisite condition to provide a medium (e.g. air gap layer 12) lower in refractive index than a prism 10 and the waveguide 3 between the bottom surface 11 of the prism 10 and the surface of the waveguide 3 and couple the light wave by the total reflection of the bottom surface 11 of the prism 10 through said medium, as shown in FIG. 2 of the accompanying drawings. Actually, as shown in FIG. 3 of the accompanying drawings, the prism 10 is pressed by a holder 13, whereby a minute air gap layer 12 less than ½ of the wavelength between the bottom surface 11 and the waveguide 3 is utilized to couple the light wave into the waveguide 3. In an optical coupler device using the coupling method utilizing a diffraction grating, a diffraction grating is formed on the waveguide 3 by a hologram sensitizer or photoresist or a diffraction grating is formed directly on the waveguide 3 by an ion beam or the like, whereby coupling is effected by the diffracted light of the light incident on the diffraction grating.

However, in the former optical coupler device using the prism coupling method, it is very difficult to maintain the air gap always stable because the air gap must be kept at about ½ or less of the wavelength used and further, there is much possibility of the waveguide 3 being damaged by the bottom surface 11 because the prism 10 is pressed from above it. Also, the use of the holder 13 makes the device bulky and this in turn leads to the disadvantage that the characteristic of compactness of the optical integrated circuit cannot sufficiently be displayed.

The coupling method using a diffraction grating is superior in compactness to the prism coupling method, but when it is considered that various function elements must be mounted on the waveguide 3 as in the aforedescribed integrated optical structure 1, it is difficult to form a diffraction grating on the waveguide 3. Also, to enhance the coupling efficiency, it is necessary that light be made to be incident from the substrate 2 side or the shape of the diffraction grating be made into an asymmetric blazed grating or the like. In the former case, operability is poor and in the latter case, such grating is difficult to form and the yield of manufacture of the optical coupler device is low due to the failure in forming the grating and the difficulty of resuscitation from the failure.

SUMMARY OF THE INVENTION

It is an object of the present invention to provide an optical coupler device which is compact and stable in characteristic.

It is another object of the present invention to provide an optical coupler device which can be simply formed and removed.

The present invention achieves these objects by an optical coupler device, which comprises a waveguide for propagating a light beam, a coupler for coupling the light beam to the waveguide, and a thin film layer provided on the bottom surface of the coupler and formed of a substance having a refractive index lower than the refractive indices of the waveguide and the coupler, the coupler being joined to the wageguide by optical contact with the thin film layer interposed therebetween.

The invention will become more fully apparent from the following detailed description thereof taken in conjunction with the accompanying drawings.

DESCRIPTION OF THE PREFERRED EMBODIMENTS

Figure 1:
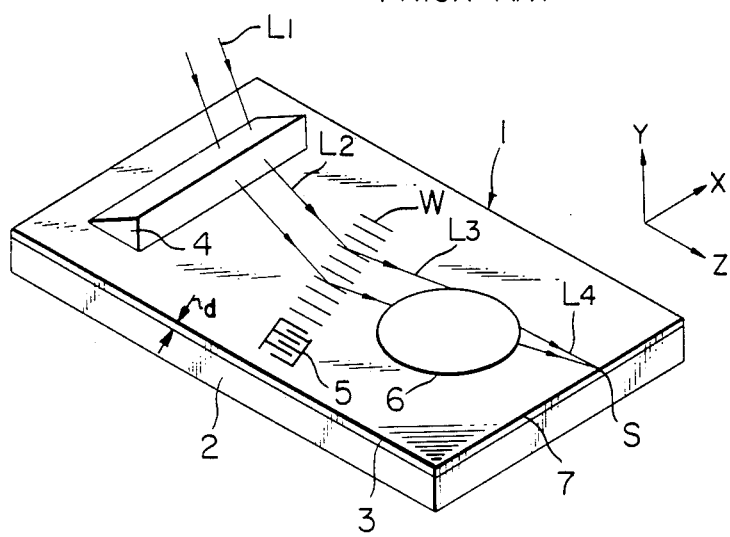
FIG. 1 is a perspective view showing an example of the conventional integrated optical structure to which the present invention is applicable.
Figure 2:
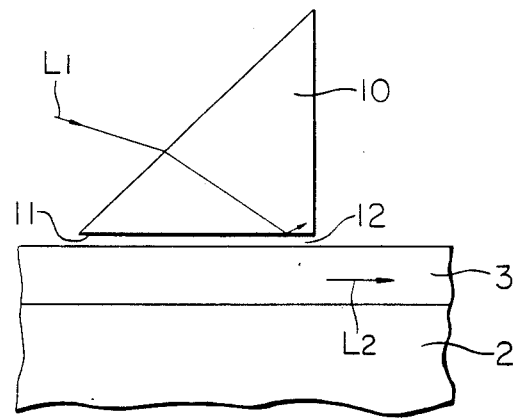
FIG. 2 is a schematic view showing the manner of coupling by the conventional prism coupling method.
Figure 3:
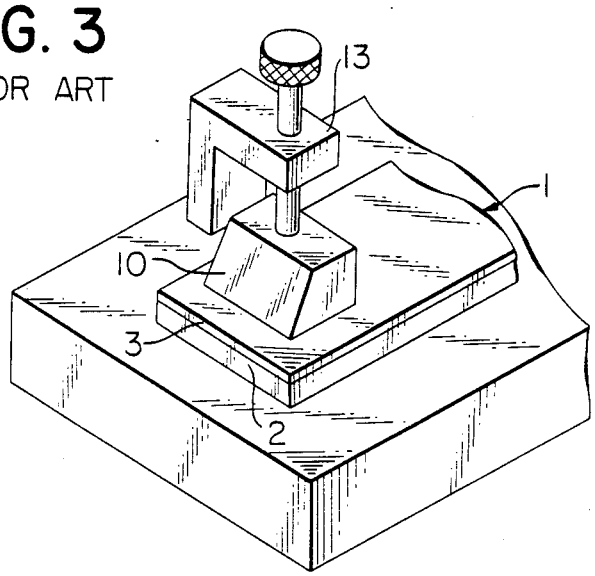
FIG. 3 is a perspective view showing a conventional optical coupler device using the prism coupling method.
Figure 4:
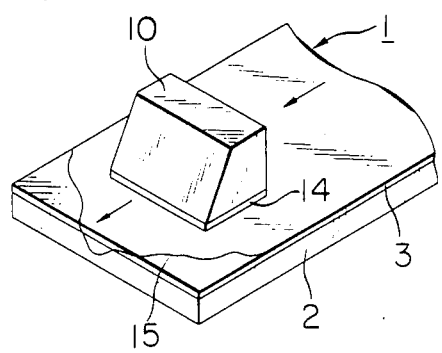
FIG. 4 is a perspective view illustrating the formation method of a first embodiment of the present invention using a prism coupler.
Figure 5:
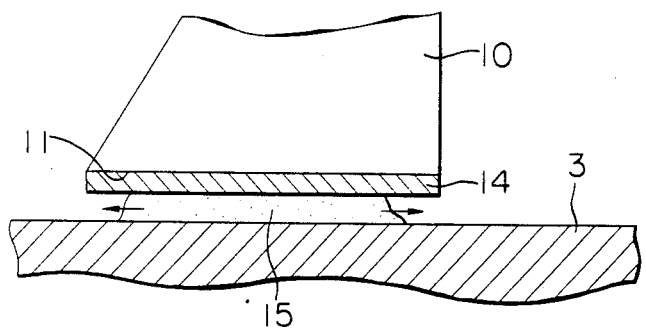
FIG. 5 is a schematic view showing the manner in which the prism coupler in the first embodiment of the present invention is joined to a waveguide.

Referring to FIG. 4, a thin film layer 14 having a refractive index lower than the refractive indices of a prism 10 and a waveguide 3 is formed on the bottom surface 11 of the prism 10 as by evaporation. By creating a thin liquid film on the joined surfaces of the prism 10 and the waveguide 3 in a fluid liquid 15 having a small percentage of impurities mixed therein such as pure water, the prism and the waveguide are joined to each other by optical contact, that is, the adhesion resulting from contacting suraces optically flat to within at least a quarter wavelength. In this state, a thin film of liquid 15 adheres to the joined surfaces and therefore, the position of the prism 10 is unstable. To bring the joined surfaces into completely intimate contact with each other, it is necessary to dry the joined surfaces in a place such as a clean bench for three to four hours. By doing so, as shown in FIG. 5, the liquid 15 between the joined surfaces gradually retreats toward the ends of the prism 10 with time and finally the joined surfaces can be brought into completely intimate contact with each other. In this case, what participates in the intimate contact is considered to be the atmospheric pressure and the intermolecular force on the joined surfaces. The prism 10 joined to the waveguide 3 by such means has a sufficient intimate contact force and has a sufficient practical strength. If it is desired to remove the once joined prism 10, it can be removed by placing the joined portions in a vaccum of 100° C. or higher temperature. As regards the materials used, Ti is diffused on the surface of a substrate 2 consisting of lithium niobate ($n_e=2.20$, $n_o=2.29$) and a portion thereof which has become higher by about 0.01 in refractive index is used as the waveguide 3, and $TiO_2$ (titanium oxide, $n_e=2.872$, $n_o=2.584$) having a refractive index higher than that of the waveguide 3 is used for the prism 10, and a thin film layer 14 consisting of a low refractive index material such as $MgF_2$ (magnesium fluoride, $n=1.38$) is preformed on the bottom surface of the prism 10 as by evaporation. In this case, the thickness of the thin film layer 14 should desirably be of a value maching the incident gaussian beam diameter ($\mu$m). The relation between the thickness and the beam diameter is fully described in "R. ULRICH. J. Opt. Soc. Am. 60. p.1337(1970)". The thickness of the thin film layer 14 by the low refractive index layer thereof is several 1000 Å and can be sufficiently realized by evaporation. The magnesium fluoride as the thin film layer 14 can form a film of low porosity by heating the substrate to the order of 300° C. during evaporation and therefore can prevent any fluctuation of the refractive index resulting from a variation in temperature or humidity. Accordingly, it is convenient to have the prism 10 joined onto the waveguide 3 of Ti-diffused lithium niobate by optical contact through the thin film layer 14 of low refractive index formed on the bottom surface 11 of the prism 10. However, during the joining, the surface of the waveguide 3 and the bottom surface 11 of the prism 10 are required to have optical planarity of one-stripe spacing in terms of Newton ring and therefore, if the surface of the waveguide 3 or of the thin film layer 14 is coarse, it must be polished in advance.

In the above-described embodiment, magnesium fluoride has been used as the thin film layer 14, but depending on the material of the waveguide 3, use may be made of $SiO_2(n=1.46)$, $LiF(n=1.36)$, $Na_3AlF_6$ (n=1.35), CaF$_2$(n=1.23) or the like. Although intimate contact means using fluid water has been described in connection with the intimate contact of the prism 10, the liquid 15 may be any volatile liquid having a good wetting characteristic relative to both of the thin film layer 14 and the waveguide 3 and is not restricted to water.

Figure 6:
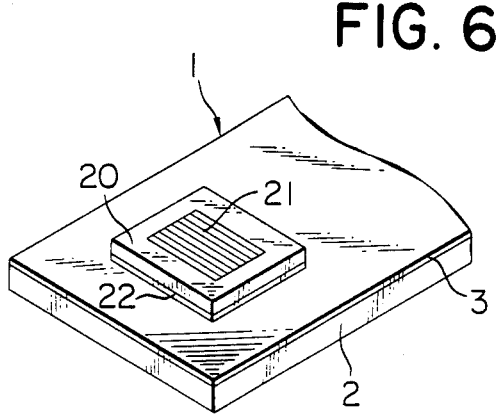
FIG. 6 is a perspective view showing a second embodiment of the present invention using as a coupler a planar substrate having a diffraction grating formed thereon.

Also, as the optical coupler, a transparent planar substrate 20 having a thickness of the order of 1.5-1 mm as shown in FIG. 6 may be used instead of the prism 10 and a grating 21 may be formed on the surface thereof so that it may perform a function similar to that of the prism 10. On the bottom surface of the substrate 20, as in the case of the prism 10, there is provided a thin film 22 having a refractive index lower than the refractive indices of the planar substrate 20 and the waveguide 3. If this planar substrate 20 is formed of a flexible material, it can be brought into intimate contact with the surface of the waveguide 3 even when there is more or less undulation in the planar substrate 20 or in a thin film layer 22 formed thereon by evaporation.

Figure 7:
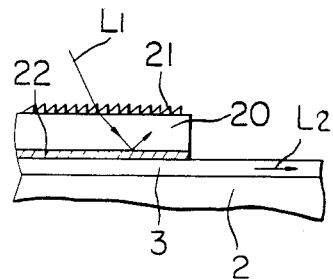
FIG. 7 is a schematic view showing the manner of coupling of a light beam in the second embodiment.
Figure 8:
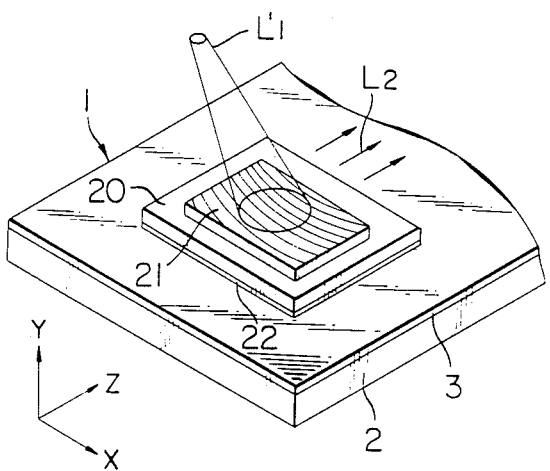
FIG. 8 is a perspective view showing a third embodiment of the present invention in which the diffraction grating is formed into a chirped shape.

As shown in FIG. 7, incident light $L_1$ is diffracted by the grating 21 formed on the planar substrate 20 and the transmitted and diffracted light is totally reflected by the boundary surface between the thin film layer 22 and the planar substrate 20 on the basis of just the same principle as in the case of the prism 10, whereby it can satisfy the phase matching condition with the waveguide light $L_2$ and can be coupled to the waveguide light $L_2$. Accordingly, the pitch of the grating 21 must be set so that phase matching with the waveguide light $L_2$ can be secured at a certain diffraction order. Thus, to enhance the coupling efficiency, the number of diffracted lights by the grating 21 should desirably be small and, for example, by adopting a blazed grating, the diffraction order can be concentrated on a particular value and the loss of the incident light in the grating 21 can be reduced. Further, where a holographic volume type grating is used as the grating 21, the pitch of this grating is made into a chirped shape in the Z direction and X direction of FIG. 8, whereby it becomes possible to transform a beam $L_1'$ of great convergence angle such as a semiconductor laser into a parallel beam and couple it to the waveguide 3. Thus, any extraneous collimating lens becomes unnecessary and this is very preferable from the viewpoint of compactness.

Figure 9:
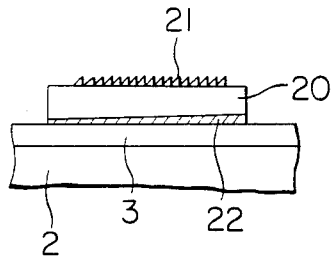
FIG. 9 is a perspective view showing a fourth embodiment of the present invention in which the thickness of a thin film layer is provided with a gradient.

Further, as shown in FIG. 9, the thickness of the thin film layer 22 may be provided with a gradient in accordance with the intensity distribution of the incident light beam, thereby realizing an optical coupler device of higher coupling efficiency. For example, where the incident light is a gaussian beam like a usual laser beam, a coupling efficiency near 100% can theoretically be obtained by providing the thin film layer 22 with an optimum thickness variation. Such gradient of the thickness of the thin film layer can be readily calculated from a mathematical expression described in R. ULRICH. J. Opt. Soc. Am. 61. p.1467(1971) which is a study for matching the relation between the intensity distribution of incident light and the optical coupling efficiency by varying the gap between the optical coupler and the waveguide along the surface of the waveguide. Such gradient of the thin film layer can of course be effectively applied to the case of the prism 10.

As has hitherto been described, in the optical coupler device according to the present invention, an optical coupler such as a prism or a diffraction grating substrate is joined onto a waveguide by optical bonding through a thin film layer of low refractive index formed on the bottom surface of the optical coupler, whereby the spacing between the coupler and the waveguide can be maintained stable by the thickness of the thin film layer, thereby obtaining a stable optical coupling characteristic. No special mechanism is required for the joining of the coupler and this leads to the provision of a compact optical coupler device.

Further, the manufacturing processes of the portion of the optical coupler and the waveguide can be completely separated from each other and moreover, the second joining is possible and this leads to a good yield of manufacture. Also, as compared with a method whereby a grating is formed on or directly on the waveguide, the present invention enables an optical coupler to be formed easily and reliably on the waveguide.

What we claim is:

1. A method for the manufacture of an optical coupler device comprising the steps of:
   forming, on a surface of a coupler for coupling a light beam to a wavegude and which coupler is to be joined to said waveguide, a thin film layer optically flat to within a quarter wavelength variation and having a refractive index lower than the refractive indices of said waveguide and said coupler;
   joining the optically flat surface of said thin film layer formed on said bottom surface of said coupler to a surface of said waveguide which is also optically flat to within a quarter wavelength variation through a thin film of volatile liquid; and
   completely evaporating said volatile liquid to bring the joined surface of said thin film layer into optical contact with said waveguide.

2. A method according to claim 1, wherein said thin film layer has a gradient in a thickness direction thereof in accordance with an intensity distribution of the light beam so as to iprove coupling efficiency.

3. A method according to claim 1, wherein said coupler is a prism coupler.

4. A method according to claim 1, wherein said coupler is a planar substrate having a diffraction grating formed on a surface thereof other than said first mentioned surface.

5. A method according to claim 4, wherein said planar substrate having the diffraction grating formed thereon is formed of a flexible material.

6. A method according to claim 4, wherein said diffraction grating is a blazed grating.

7. A method according to claim 4, wherein said diffraction grating is a volume type grating including a chirped shape or the like.

* * * * *